(12) United States Patent
Nies

(10) Patent No.: US 7,898,140 B2
(45) Date of Patent: Mar. 1, 2011

(54) BRUSHLESS SLIP RING FOR A WIND TURBINE AND METHOD OF ASSEMBLY

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 12/171,915

(22) Filed: Jul. 11, 2008

(65) Prior Publication Data
US 2010/0007237 A1    Jan. 14, 2010

(51) Int. Cl.
H02K 13/00    (2006.01)
H01R 39/08    (2006.01)
H01R 39/04    (2006.01)
H01R 39/32    (2006.01)
H01R 39/00    (2006.01)

(52) U.S. Cl. .............. 310/231; 310/232; 310/233; 310/234; 310/235

(58) Field of Classification Search ........... 310/227, 310/231–235; 439/5, 18–19
See application file for complete search history.

(56) References Cited

U.S. PATENT DOCUMENTS

| | | | |
|---|---|---|---|
| 2,716,223 A * | 8/1955 | Griefen | 439/5 |
| 2,753,476 A | 7/1956 | Watt | |
| 2,845,554 A | 7/1958 | Schwab et al. | |
| 2,848,570 A * | 8/1958 | Cole, Jr | 200/196 |
| 3,295,091 A * | 12/1966 | Von Mossin | 439/5 |
| 3,312,843 A | 4/1967 | Krulls | |
| 3,431,532 A * | 3/1969 | Cary | 439/5 |
| 3,483,307 A | 12/1969 | Goodman, Jr. | |
| 3,806,745 A * | 4/1974 | Verhoeven et al. | 310/227 |
| 3,984,715 A | 10/1976 | Kullmann et al. | |
| 4,047,063 A | 9/1977 | Reece et al. | |
| 4,156,155 A | 5/1979 | Cannell et al. | |
| 4,323,292 A | 4/1982 | Lewis et al. | |
| 4,484,789 A * | 11/1984 | Leitner et al. | 439/5 |
| 7,019,431 B1 | 3/2006 | Kerlin | |
| 7,320,363 B2 | 1/2008 | Sand et al. | |
| 7,449,794 B2 * | 11/2008 | Guey et al. | 290/44 |

* cited by examiner

*Primary Examiner*—Quyen Leung
*Assistant Examiner*—Jose A Gonzalez Quinones
(74) *Attorney, Agent, or Firm*—James McGinness, Esq.; Armstrong Teasdale LLP

(57) ABSTRACT

A brushless slip ring has a first conductive rotating member, and a second conductive non-rotating member that is positioned a predetermined distance away from the first conductive rotating member. A conductive semi-solid material electrically couples the first conductive rotating member to the second conductive non-rotating member. The semi-solid material is configured to transfer electric current from the rotating member to the non-rotating member.

20 Claims, 4 Drawing Sheets

BRUSHLESS SLIP RING FOR A WIND TURBINE AND METHOD OF ASSEMBLY

BACKGROUND OF THE INVENTION

The present disclosure relates generally to generators, and more particularly to slip rings used with wind turbine generators to transfer electrical current.

As energy prices have increased, wind turbines have received increased attention as environmentally safe and relatively inexpensive alternative energy sources. With this growing interest, considerable efforts have been made to develop wind turbines that are reliable and efficient.

Generally, known wind turbines include a rotor having multiple blades. The rotor is mounted to a housing or nacelle that is positioned on top of a truss or tubular tower. Utility grade wind turbines (i.e., wind turbines designed to provide electrical power to a utility grid) can have large rotors (e.g., 30 or more meters in diameter). Blades on rotors transform wind energy into a rotational torque or force that drives one or more generators that may be rotationally coupled to the rotor either directly or through a gearbox. The gearbox increases or steps up the inherently low rotational speed of the turbine rotor for the generator to efficiently convert mechanical energy to electrical energy, which is then transmitted to a utility grid.

Wind turbines including direct drive generators eliminate the gearbox, and reliability problems associated with the gearboxes. However, in at least some known direct drive or geared wind turbines, the slip rings used to transfer electrical current from a rotating shaft to a stationary member may prematurely fail. Known slip rings generally use a brush assembly to transfer the electrical current. However, such brush assemblies wear over time and generally require periodic replacement. The replacement of the brush assemblies increases the operational costs associated with the wind turbine. In some instances, replacement of the brush assemblies may require the wind turbine to be offline in a non-productive and non-operational state.

Additionally, at least some known slip ring assemblies, use mercury to transfer electrical current across the slip ring assembly. Although somewhat useful, the inclusion of mercury may adversely affect the manufacturing, distribution, operation and maintenance of the slip rings because mercury is toxic, and is a hazardous material that requires special handling.

BRIEF DESCRIPTION OF THE INVENTION

In one aspect, a brushless slip ring is provided. The brushless slip ring includes a first conductive rotating member and a second conductive non-rotating member positioned a predetermined distance away from the first conductive rotating member. A conductive semi-solid material electrically couples the first conductive rotating member to the second conductive non-rotating member. The semi-solid material is configured to transfer electric current from the rotating member to the non-rotating member.

In another aspect, a wind turbine is provided. The wind turbine includes a structural base and a wind driven power generator supported by the structural base. The wind turbine has a rotating shaft and at least one rotatable blade extending from the rotating shaft. The generator further includes at least one brushless slip ring coupled therein. The brushless slip ring includes a first conductive rotating member, a second conductive non-rotating member, and a conductive semi-solid material. The second conductive non-rotating member is coupled to the first conductive rotating member via the conductive semi-solid material such that the first member is a predetermined distance from the second member. The semi-solid material is configured to transfer electric current from the rotating member to the non-rotating member.

In a further aspect, a method of assembling a brushless slip ring is provided. The method includes coupling a first conductive rotating member about a rotatable shaft, and electrically coupling a second conductive non-rotating member to the first member using a conductive semi-solid material such that the first member is a predetermined distance away from the second member. Transferring electric current from the rotating member to the non-rotating member using the semi-solid material.

It will thus be observed that configurations of the present invention provide wind turbines with brushless slip rings that have increased operational durability. Moreover, some configurations of the present invention will also be observed to provide other advantages, such as increased wind turbine productivity.

DETAILED DESCRIPTION OF THE INVENTION

Figure 1:
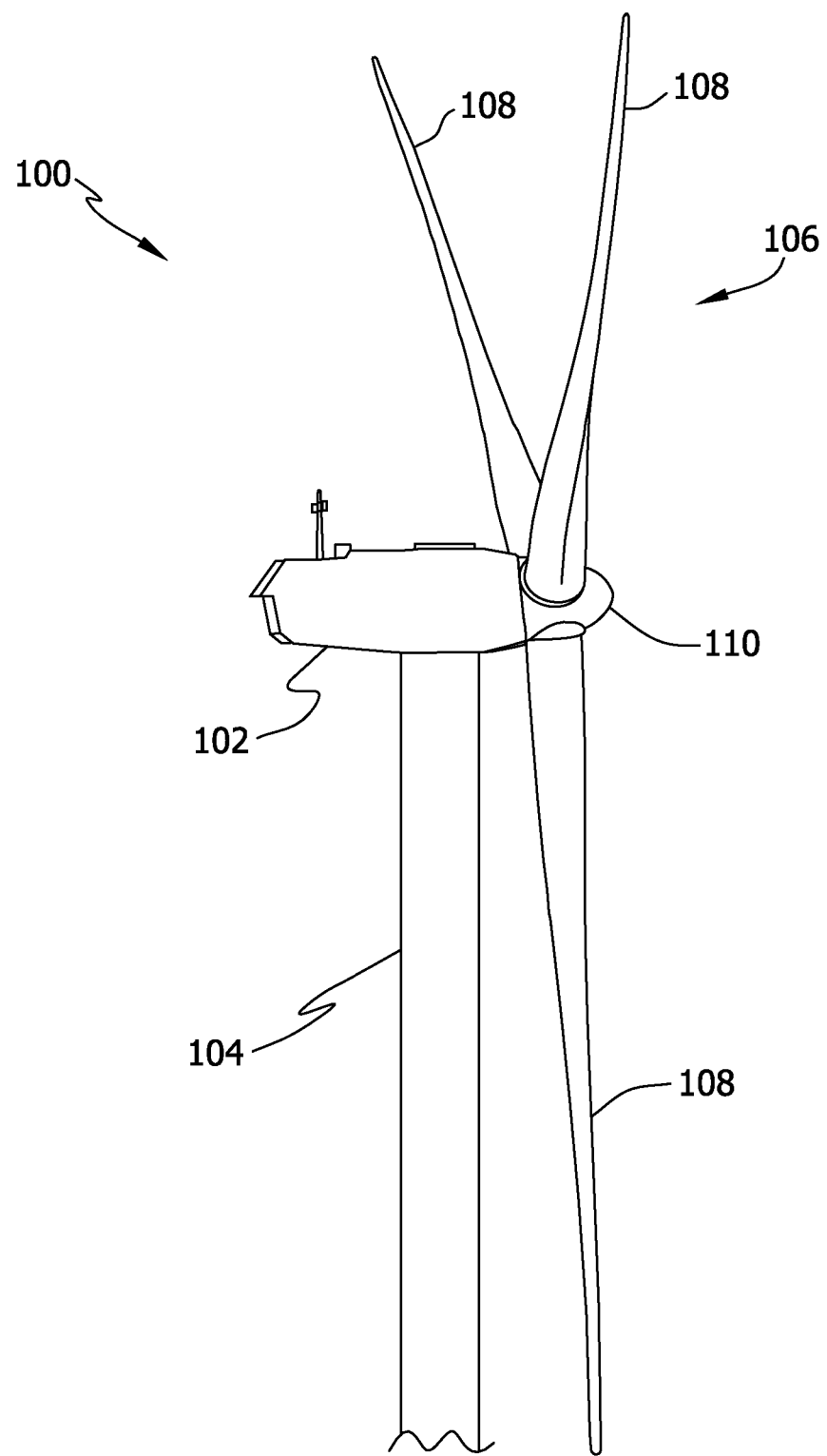
FIG. 1 is a side schematic view an exemplary wind turbine.

In some configurations and referring to FIG. 1, a wind turbine 100 includes a nacelle 102 that houses a generator (not shown in FIG. 1). In an exemplary embodiment, nacelle 102 is coupled atop a tall tower 104, only a portion of which is shown in FIG. 1. Wind turbine 100 also includes a rotor 106 that includes one or more rotor blades 108 coupled to a rotating hub 110. Although wind turbine 100 illustrated in FIG. 1 includes three rotor blades 108, there are no specific limits on the number of rotor blades 108 required by the present invention.

Figure 2:
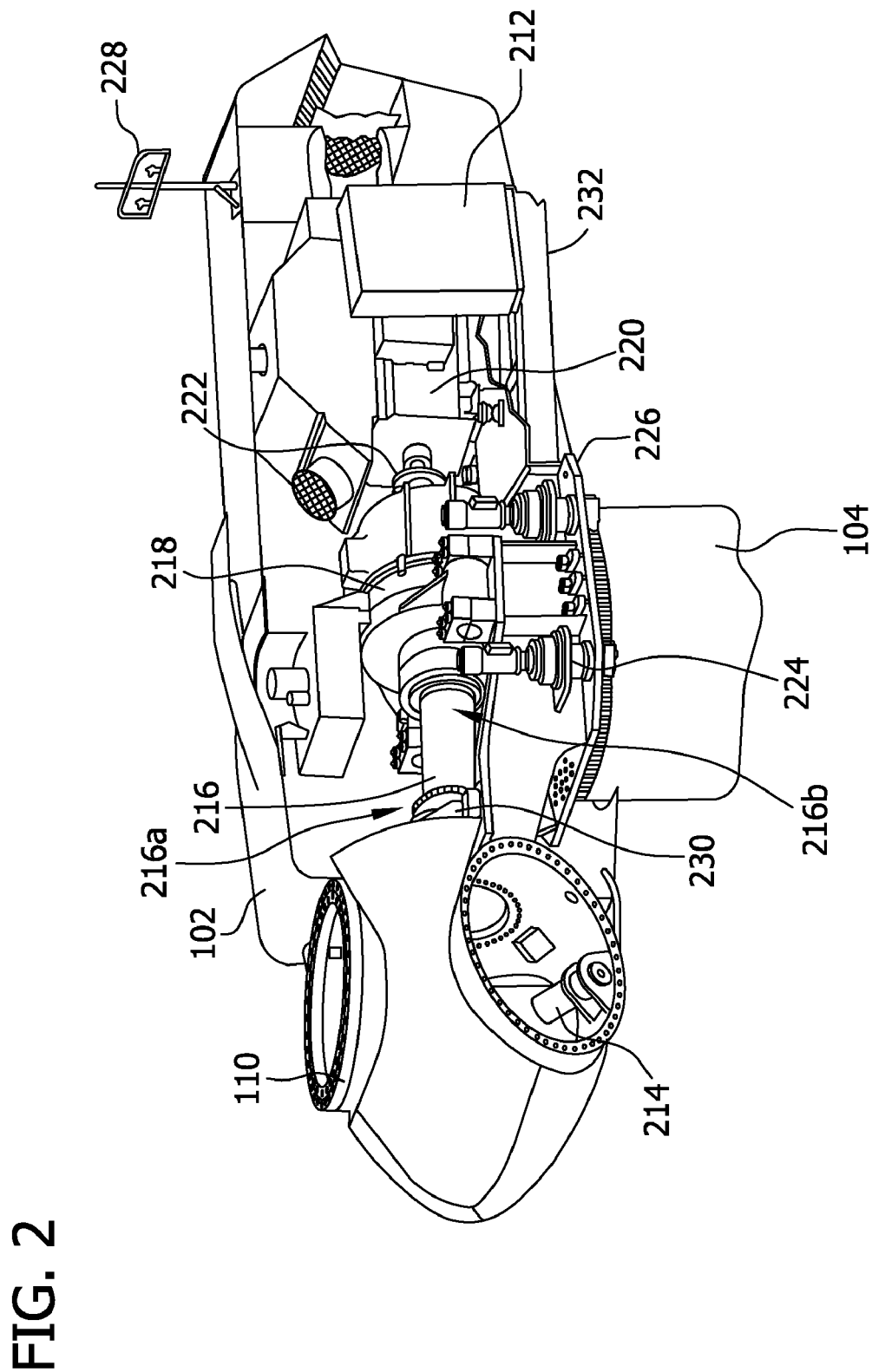
FIG. 2 is a cut-away perspective view of a nacelle that may be used with the wind turbine shown in FIG. 1 and including a geared drive train coupled to a generator.

In some configurations and referring to FIG. 2, various components are housed in nacelle 102 atop tower 104 (shown in FIG. 1) of wind turbine 100 (shown in FIG. 1). A height (not shown) of tower 104 is selected based upon factors and conditions known in the art. In some configurations, one or more microcontrollers (not shown) within control panel 212 include a control system used for overall system monitoring and control of the wind turbine. Alternative distributed or centralized control architectures may be used in some configurations.

In some configurations, a variable blade pitch drive 214 is provided to control a pitch of blades 108 (shown in FIG. 1) substantially simultaneously based on a direction of wind. In other configurations, the pitches of blades 108 are individually controlled by blade pitch drive 214.

The drive train of wind turbine 100 includes a main rotor shaft 216, also referred to as a "low speed shaft", coupled to hub 110 via main bearing 230 at a first end and 216a, in some configurations, at an opposite end 216b of shaft 216 to a gear box 218. Gear box 218 drives a high speed shaft (not shown in FIG. 2) of an electrical power generator 220. In other configurations, main rotor shaft 216 is coupled directly to generator 220. The high speed shaft is used to drive generator 220. Generator 220 is mounted on main frame 232. In some configurations, rotor torque is transmitted via coupling 222. In an exemplary embodiment, generator 220 is a direct drive permanent magnet generator.

In an exemplary embodiment, yaw drive 224 and yaw deck 226 provide a yaw orientation system for wind turbine 100. A meterological boom 228 provides information for a turbine control system that includes a yaw orientation system. The meterological boom 228 may include instrumentation sensors for wind direction and/or wind speed. In some configurations, the yaw orientation system is mounted atop tower 104.

Figure 3:
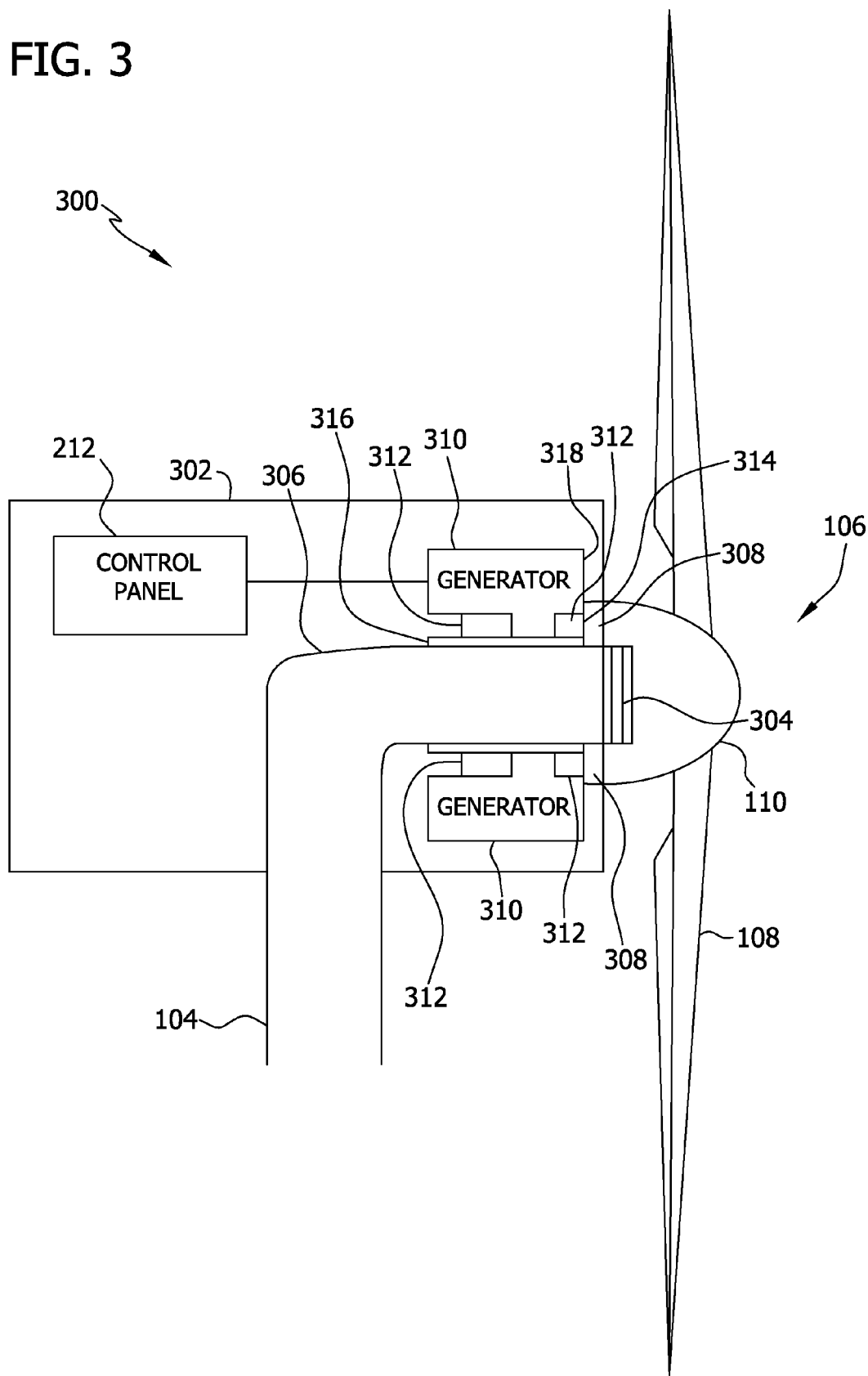
FIG. 3 is a side cut-away view of an exemplary direct drive wind turbine generator configuration.

FIG. 3 is a side cut-away view of an exemplary embodiment direct drive wind turbine 300. In an exemplary embodiment, wind turbine 300 includes rotor 106, a nacelle 302, a slip ring 304, an insulation tube 308 fabricated from insulation material, an insulation layer 308, and tower 104. In an exemplary embodiment, nacelle 302 includes a direct drive generator 310, a plurality of bearings 312, a rotary shaft 316, and control panel 212. Moreover, in the exemplary embodiment, direct drive wind turbine 300 does not include gear box 218. Insulation tube 306 is fabricated from an insulation material. Insulation layer 308 extends between hub 110 and direct drive generator 310 to electrically isolate generator 310 from hub 110. Insulation layer 308 also extends between bearing 312 and hub 110 to electrically isolate bearing 312 from hub 110. In an exemplary embodiment, insulation layer 308 is formed across a face 314 of bearing 312 and across a face 318 of generator 310. Faces 314 and 318 are oriented to face hub 110. Slip ring 304 is mounted on insulation tube 306, and rotary shaft 316 circumscribes insulation tube 306 and is substantially concentric with insulation tube 306. Insulation tube 306 extends from hub 110 to tower 104. Slip ring 304 is coupled to a conductor within insulation tube 306.

Direct drive wind turbine 300 uses rotor 106 and rotary shaft 316 to directly drive generator 310. Rotary shaft 316 rotates with rotor 106 and rotary shaft 316 is supported by a plurality of bearings, such as bearing 312 coupled to insulation tube 306. The bearings enabled rotary shaft 316 to rotate with respect to insulation tube 316. Direct drive wind turbine 300 has a variable-speed configuration and uses control panel 212, to control wind turbine 300 and direct drive generator 310. In some embodiments, control panel 212 may also convert a variable-voltage, variable-frequency power of direct drive generator 310 to a standard utility voltage and frequency. Rotational energy of rotor blade 108 is transferred via hub 110 to direct drive generator 310 that correspondingly uses the rotational energy to produce electricity.

Figure 4:
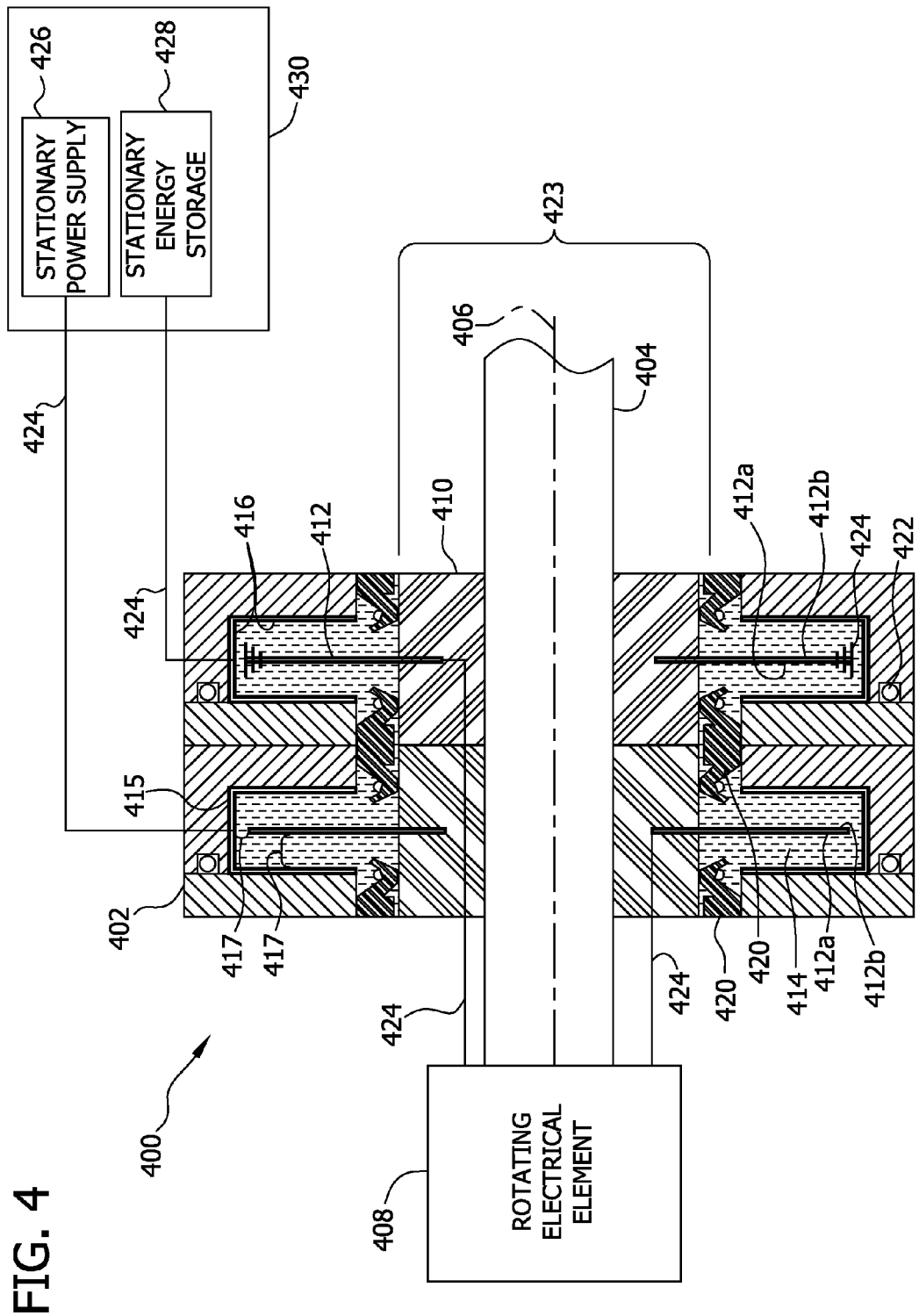
FIG. 4 is a cross-sectional schematic view of an exemplary brushless slip ring that may be used with the wind turbine configurations shown in FIGS. 2 and 3.

FIG. 4 illustrates a cross-sectional schematic view of an exemplary brushless slip ring 400 that may be used with the gear box wind turbine configuration (shown in FIG. 2) and the direct drive wind turbine configuration (shown in FIG. 3). Slip rings 400 are used to transfer electrical current and/or data signals from a rotating shaft to an adjacent stationary member as described in more detail below. The following description of a brushless slip ring is applicable to both wind turbine configurations, as well as to other implementations wherein it is required to transfer electrical current or signals from a rotating member to an adjacent stationary member.

In an exemplary embodiment, a brushless slip ring 400 includes a housing 402 that circumscribes a rotatable shaft 404. Shaft 404 rotates about an axial centerline 406. One or more rotating electrical elements 408 are coupled to rotatable shaft 404. In addition, at least one non-conductive sleeve 410 circumscribes shaft 404. At least one conductive rotating member 412 extends radially outward from sleeve 410 at least partially into a cavity 414 defined within housing 402. A conductive non-rotating member 416 is positioned within cavity 414, is electrically isolated from the cavity 414 by insulating material 415 and is spaced a predetermined distance away from rotating member 412. Cavity 414 also contains a conductive semi-solid material 418 that electrically couples rotating member 412 to non-rotating member 416. One or more cavity seals 420 are coupled between housing 402 and sleeve 410, such that material 418 within cavity 414 is electrically isolated from rotatable shaft 404 and any adjacent cavity remote from cavity 414.

In an exemplary embodiment, housing 402 is annular and is formed with a center aperture 423 that is substantially concentric with centerline 406. Housing 402 also includes an internal circumferential cavity 414 formed therein. Housing 402 may be fabricated from one or more several known manufacturing processes such as, but not limited to, casting, machining, injection molding, thermal forming, extruding and/or any other techniques recognized by those of ordinary skill in the art. Many suitable materials may be used to fabricate housing 402 as determined by the particular manufacturing process implemented. For example, in an embodiment, housing 402 may be injection molded using a polymer compound. Housing 402 may be transparent or translucent, such that an amount or level of the conductive semi-solid material 418 within cavity 414 may be determined by external visual inspection.

In an exemplary embodiment, housing 402 includes one or more externally accessible ports 422 formed or fitted therein. Each port 422 may be used to fill cavity 414 with conductive semi-solid material 418 during manufacture, and/or to facilitate inspection and maintenance procedures. Additionally, ports 422 can be used to vent or purge cavity 414 of excess air during operation.

Shaft 404 extends through housing 402 and is rotatable about centerline 406. Shaft 404 includes one or more rotating electrical elements 408 that rotate with shaft 404. For example, rotating electrical element 408 may be an armature for a generator or electric motor.

Moreover, at least one non-conductive sleeve 410 is coupled to, and rotates with, shaft 404. Sleeve 410 is positioned within aperture 423 and engages one or more seals 420, such that cavity 414 is defined between housing 402 and sleeve 410. Seals 420 may be either a stationary type seal that is coupled to housing 402 and that enables shaft 402 and sleeve 410 to rotate therein, or seals 420 may be a dynamic-type seal that facilitates increasing sealing during operation by exploiting the rotational forces of brushless slip ring 400. Sleeve 410 may be fabricated using any several known manufacturing processes such as, but not limited to, casting, machining, injection molding, thermal forming, extruding and/or any other techniques recognized by those of ordinary skill in the art. Many suitable materials may be used to fabricate non-conductive sleeve 410, such as, but not limited to, plastic, nylon, and/or any other non-conductive material as required by the particular manufacturing process implemented.

In an exemplary embodiment, at least one conductive rotating member 412 extends generally radially from the non-conductive sleeve 410 into cavity 414. Rotating member 412 and member 416 are each fabricated from a conductive material that enables the flow electricity therethrough. For example, member 412 may be fabricated from, but not limited to, copper, brass, steel, and/or aluminum. In an exemplary embodiment, conductive rotating member 412 is a torus that circumscribes non-conductive sleeve 410 and extends radially into cavity 414. Alternatively, conductive rotating member 412 may have any other shape that enables slip ring 400 to function as described herein. For example, member 412 may be fabricated from or include wedge-shaped portions that are spaced about sleeve 410. Alternatively, member 412 may be semi-circular and/or included a plurality of apertures or openings that enable the conductive semi-solid material to flow therethrough. In an exemplary embodiment, member 412 also includes a plurality of fins or veins 424 that extend outwardly from a front surface 412a and/or a rear surface 412b of member 412. The use of fins 424 increases an amount of surface area in contact with the conductive semi-solid material 418 and thereby facilitates increasing the overall electrical current that can be transferred through slip ring 400.

Rotating member 412 is electrically coupled to one or more rotating electrical elements 408 via one or more electrical conductors 424. Electrical conductors 424 may be coupled to an input, output or any combination thereof, of the rotating electrical element 408. Each of electrical conductors 424 extend through non-conductive sleeve 410 and isolate electrical current flowing through conductor 424 from rotatable shaft 404.

In some embodiments, non-rotating member 416 is positioned within cavity 414 of housing 402 such that member 416 substantially conforms to an inner surface of cavity 414. Alternatively, in another embodiment, conductive non-rotating member 416 only partially conforms to a portion of cavity inner surface. In each embodiment, conductive non-rotating member 416 is positioned near, and proximate to, conductive rotating member 412, such that a gap 417 is defined between members 412 and 416 and such that members 412 and 416 are not in physical contact with each other. In another exemplary embodiment, non-rotating member 416 is electrically isolated from the inner surface of cavity 414 by positioning an insulating material 415 between member 416 and inner surface of cavity 414. The insulating material 415 may be any non-conductive material such as rubber, nylon, ceramic or other materials that prevent the flow of electrical current therethrough.

In another exemplary embodiment, the configuration of the brushless slip ring described above is inverted such that the shaft has a cavity and the housing has a conductor that extends into the cavity. For example, the rotatable shaft may be structurally configured to define an annular housing that includes a cavity therein. In this embodiment, a first conductive member is coupled to an external housing and extends into the cavity formed in the rotatable shaft. A second conductive member is positioned within the cavity and rotates with the shaft. A conductive semi-solid material is contained within the cavity and electrically couples the first and second conductive members.

Non-rotating member 416 is electrically coupled to one or more stationary power supplies 426 via at least one electrical conductor 424. Additionally, non-rotating member 416 may be electrically coupled to at least one stationary energy storage 428 via at least one electrical conductor 424. As such, electrical conductors 424 may be coupled to an input, an output and/or any combination thereof of the stationary power supplies/energy storage devices 426 and 428, respectively. Electrical conductors 424 extend through housing 402 via an aperture or channel formed in housing 402. Alternatively, non-rotating member 416 and electrical conductors 424 may be integrally formed within housing 402.

In another exemplary embodiment, power supplies 426 and energy storage devices 428 may be combined into one device such as a power management system 430. The power management system 430 may be configured to provide additional functionality such as a reversible a power supply and power consumer. Additionally, the power management system 430 may also incorporate one or more data signals for operational use of power generating wind turbine 100.

Semi-solid material 418 is contained between the conductive non-rotating and rotating members 416 and 412, respectively and provides electrical coupling there between. In an exemplary embodiment, semi-solid material 418 is a grease that has been impregnated or filled with a metallic material. Material 418 enables electrical current to flow from rotating member 412 to non-rotating member 416 when member 412 is rotating with respect to member 416. Material 418 may be one of several known compounds such as, but not limited to, silver-filled grease, copper-filled grease, and/or iron-filled grease. Although semi-solid material 418 is described a grease, it is contemplated that a high viscosity metal-impregnated fluid may be used such as, but not limited to, a silver, copper, alloy, and/or iron-filled hypoid gear oil. It is also contemplated that semi-solid material 418 may be a conductive oil or a conductive powder that enables electric current flow therethrough. The conductive power may be, but not limited to, a graphite powder, a charcoal powder or a powder consisting of conductive micro-spheres. In an embodiment, the conductive semi-solid material 418 substantially retains its form at standard temperature and pressure. One exemplary conductive semi-solid material is silver filled grease commercially available from SPI Supplies of West Chester, Pa.

In some embodiments, the conductive semi-solid material 418 only partially fills cavity 414 such that material 418 has room to thermally expand within cavity 414. In an alternate configuration, material 418 substantially fills cavity 414 such that the volume of semi-solid material 418 is approximately equal to a volume of cavity 414. In another alternate configuration, the housing 402 may be flexible such that the housing 402 can partially expand to accommodate thermal expansion of material 418. One of ordinary skill in the art should appreciate that the extent to which cavity 414 is filled with conductive semi-solid material 418 may be determined by the particular installation and operating conditions of the brushless slip ring.

In an exemplary embodiment, a plurality of brushless slip rings 400 may be used in cooperation to provide increased functionality as required by various installations and operating conditions. For example, in a power generator application, a pair of brushless slip rings 400 may be combined; wherein a first supplies an initialization voltage to an armature of a power generator, and wherein a second for receives the output power from the armature. A further example provides multiple brushless slip rings 400 for use in a multi-phase power system, such as 3 brushless slip rings for use in a 3 phase power system. Additionally, multiple brushless slip rings may be used in an instrumentation system for transferring multiple data signals from a moving member to a non-moving member.

In another exemplary embodiment, conductive rotating member 412 and conductive non-rotating member 416 may be oriented for linear motion there between. In this alternate embodiment, it is contemplated that rotating member 412 be slidably coupled to conductive non-moving member 416. In such an embodiment, a conductive semi-solid material is contained within a cavity formed between the moving and non-moving members and electrically couples the members.

Another exemplary embodiment provides a brushless slip ring that includes two rotating conductive members. It is contemplated that the second conductive member coupled to the housing may rotate with the housing. In this embodiment, the housing and the shaft may both rotate with respect to each other and may rotate at different rotational speeds. The rotating housing and shaft may rotate in the same direction, in opposing directions or combinations thereof.

In another variation, an exemplary embodiment of the brushless slip ring is installed in a larger dynamic system such as a crane, a robotic assembly, or other equipment using multiple moving components. In this embodiment, the housing and second conductor may be non-rotatable with respect to the rotatable shaft and first conductor, however the housing and shaft may move, translate or rotate with the components of the larger dynamic system.

In operation, brushless slip ring described herein provides an improved and efficient means for conducting electrical signals and/or electrical power from a rotating member to a stationary member or in the alternative, from a first moving member to a second moving member. The brushless slip ring uses a conductive semi-solid material contained within a housing cavity, wherein a rotatable shaft having a first conductive member may rotate with respect to a second conductive member positioned within the housing and electrical current and/or signals may be transferred between the two conductive members.

Exemplary embodiments of the brushless slip ring and methods of transferring current are described above in detail. The methods and the apparatus are not limited to the specific embodiments described herein nor to the specific components being used or assembled, but rather, the brushless slip ring described herein may be utilized independently and separately from other components and systems described herein or to other devices not described herein. For example, other turbine components can also utilize the brushless slip ring described herein such as an instrumentation system measuring performance parameters of a rotating shaft. In the alternative, the shaft may be stationary and the housing configured to rotate around the shaft.

While the invention has been described in terms of various specific embodiments, those skilled in the art will recognize that the invention can be practiced with modification within the spirit and scope of the claims.

What is claimed is:

1. A brushless slip ring comprising:
   a non-conductive sleeve positioned circumferentially about a rotatable shaft;
   a rotatable first conductive member extending radially outward from said non-conductive sleeve, at least one fin extending from a surface of said first conductive member;
   a non-rotatable second conductive member positioned a predetermined distance away from said first conductive member; and
   a conductive semi-solid material electrically coupling said first conductive member to said second conductive member, said semi-solid material configured to transfer electric current from said first conductive member to said second conductive member.

2. A brushless slip ring in accordance with claim 1 wherein said non-conductive sleeve electrically isolates said first conductive member from the rotatable shaft.

3. A brushless slip ring in accordance with claim 1 further comprising:
   an annular housing comprising an outer wall comprising at least one aperture extending therethrough, said housing defining a cavity therein, said conductive semi-solid material and said second conductive member are housed within said cavity; and
   an insulating material positioned between said second conductive member and said cavity, said material electrically isolates at least said second conductive member from said housing.

4. A brushless slip ring in accordance with claim 3 wherein said first conductive member extends into said cavity.

5. A brushless slip ring in accordance with claim 3 wherein said housing circumscribes the rotatable shaft.

6. A brushless slip ring in accordance with claim 3 further comprising at least one pair of seals coupled to said housing and configured to maintain said conductive semi-solid material within said cavity and electrically isolated from the rotatable shaft.

7. A brushless slip ring in accordance with claim 3 wherein said second conductive member substantially circumscribes said first conductive member.

8. A brushless slip ring in accordance with claim 1 wherein said conductive semi-solid material comprises at least one of a silver-impregnated grease, a carbon-impregnated grease, a metallic-alloy impregnated grease, a conductive oil, and a conductive powder.

9. A wind turbine comprising;
   a structural base; and
   a wind driven power generator supported by said structural base and comprising a rotatable shaft and at least one rotatable blade extending therefrom, said power generator further comprising at least one brushless slip ring coupled to said rotatable shaft, said slip ring comprising a non-conductive sleeve positioned circumferentially about said rotatable shaft, a rotatable first conductive member extending radially outward from said non-conductive sleeve, at least one fin extending from a surface of said first conductive member, a non-rotatable second conductive member, and a conductive semi-solid material, said second conductive member coupled to said first conductive member via said conductive semi-solid material such that said first conductive member is a predetermined distance from said second conductive member, said semi-solid material is configured to transfer electric current from said first conductive member to said second conductive member.

10. A wind turbine in accordance with claim 9 wherein said non-conductive sleeve electrically isolates said first conductive member from said rotatable shaft.

11. A wind turbine in accordance with claim 9 further comprising:
    an annular housing comprising at least one wall comprising an aperture extending therethrough, said housing defining a cavity therein, said conductive semi-solid material and said second conductive member housed within said cavity; and
    an insulating material positioned between said second conductive member and said cavity, said material electrically isolates at least said second conductive member from said housing.

12. A wind turbine in accordance with claim 11 wherein said first conductive member extends into said cavity.

13. A wind turbine in accordance with claim 10 wherein said first conductive member circumscribes said rotating shaft.

14. A wind turbine in accordance with claim 11 further comprising at least one pair of seals coupled to said annular housing and configured to contain said conductive semi-solid material within said cavity and electrically isolate said conductive semi-solid material from said rotatable shaft.

15. A wind turbine in accordance with claim 9 wherein said conductive semi-solid material comprises at least one of a silver-impregnated grease, a carbon-impregnated grease, a metallic-alloy impregnated grease, a conductive oil, and a conductive powder.

16. A wind turbine in accordance with claim 11 wherein said second conductive member substantially circumscribes said first conductive member.

17. A method of assembling a brushless slip ring, said method comprising:

coupling a non-conductive sleeve circumferentially about a rotatable shaft;

coupling a rotatable first conductive member to the non-conductive sleeve, the first conductive member extending radially outward from the non-conductive sleeve, at least one fin extending from a surface of the first conductive member;

electrically coupling a non-rotatable second conductive member to the first conductive member using a conductive semi-solid material such that the first conductive member is a predetermined distance away from the second conductive member; and transferring electric current from the first conductive member to the second conductive member through the conductive semi-solid material.

18. A method of assembling a brushless slip ring in accordance with claim 17 further comprising:

coupling the non-conductive sleeve about the rotatable shaft such that the non-conductive sleeve electrically isolates the first conductive member from the rotatable shaft;

coupling an annular housing about the rotatable shaft such that the second conductive member is positioned with a cavity defined in the housing;

positioning an insulating material between the second conductive member and the cavity, wherein the material electrically isolates the second conductive member from the housing; and coupling at least a pair of seals to the annular housing such that the pair of seals facilitate maintaining the conductive semi-solid material within the housing cavity and electrically isolating the conductive semi-solid material from the rotatable shaft.

19. A method of assembling a brushless slip ring in accordance with claim 17 wherein the conductive semi-solid material is at least one of a silver-impregnated grease, a carbon-impregnated grease, a metallic-alloy impregnated grease, a conductive oil, and a conductive powder.

20. The method of assembling a brushless slip ring in accordance with claim 18 further comprising coupling the first conductive member about the rotatable shaft such that the first conductive member extends into the housing cavity.

* * * * *